Patented July 19, 1938

2,124,232

UNITED STATES PATENT OFFICE 2,124,232

METAL FOIL

Harvey G. Kittredge and Frank W. Williams, Dayton, Ohio, assignors to Foilfilm, Inc., Dayton, Ohio, a corporation of Ohio No Drawing. Application October 21, 1935, Serial No. 45,966

10 Claims. (Cl. 91—68)

Our invention relates to a product which will adhere to metal and adhere to glass.

It is our object to provide a synthetic resin that has a tough, elastic and flexible body, and that is adherent to metal and to glass; and which has the further characteristics that upon being applied to metal when in solution will dry on the metal as a tough, flexible adherent coating for the metal, and will adhere to glass thereafter, upon being reheated and subjected to some degree of pressure.

It is a further object of our invention to provide a substantially transparent, tough, metal-adherent, flexible material that can be applied to metal foil which is structurally weak, with the result that the metal foil is structurally strong, without losing any of its characteristics of appearance, light weight and of being impervious to moisture.

It is a further object to provide such a coating that is substantially non-hygroscopic.

It is our object to provide a new article of manufacture, such as a structurally weak metal foil and the coating of this invention to provide a resulting new product that has the characteristics of metal foil without its weakness, which can be folded and formed into packages or into labels; which can be made adherent to itself or to glass, and which will maintain the metal foil in smooth, brilliant condition as it is originally produced, irrespective of being folded, pressed or sealed.

The metal foil that we refer to ranges in thickness from .00025 up to .001, but we do not desire to be confined to any particular thickness of foil. We have found that the compounds of this invention are adherent to all types of metal. Foil that is structurally so weak as to ordinarily have to be supported by a paper backing, and which when handled has to be handled with the greatest care, can be converted into a strong, tough and flexible material by the practice of the present invention.

The objection to materials for strengthening foil heretofore has been that they do not adhere; that they are water absorbent, defeating the very object of using foil for wrappers; they are brittle or very sticky. These objections have been overcome by the present invention.

Our invention consists broadly of a compound having the following characteristics:

(a) A tough body capable of being formed into a transparent film that is usually substantially water-white, and has a brilliant, scintillating appearance that sparkles.

(b) A film that is metal-adherent so that upon being applied in a solvent condition at a predetermined temperature will dry on metal as on metal foil, and form with the foil a unitary structure so that the foil and the film cannot be detached one from the other.

(c) A flexible material that can be bent, folded and twisted without the fracture of the metal or the film made an integral part of the metal.

(d) The sheet can be softened upon the application of heat so that it can be sealed one part to the other, or can be applied to glass by re-heating and the application of slight pressure.

(e) The material has such viscosity that it has a uniform drying throughout, without bubbles, resulting in perfect adhesion between the metal and the material or between the material and glass.

We have found that among the materials that provide for a tough body film are cellulose acetate, cellulose nitrate, vinyl aceate, vinyl aceate polymerized, vinyl acetate modified with acetaldehyde, and various other equivalent resins that are normally flexible and hard and tough, but not adherent to metal.

We have found that substances that are adherent to metal, but which are not flexible, hard and tough are such materials as a saturated alkyd resin, coumaron-indene resin, a phenolic resin, shellac, de-waxed shellac, and gum dammer.

We have found that materials which are suitable plasticizers are chlorinated diphenyl, triphenyl phosphate, tricresyl phosphate and dibutyl phthalate. Such plasticizers are flexible and control the drying rate.

We find such solvents as toluol, naphtha, butyl acetate or methyl alcohol to be suitable for purposes of this invention.

We find that the addition of linoleate of lead controls the drying rate in connection with an oxidizing substance, and the addition of waxes and stearates control the tendency of the compound in films to stick to one another, particularly where it is necessary to roll the composite foil film, after having been produced in the interim, before it is utilized in commerce.

Our invention consists of the combination of a tough body means and adherent means, a flexible means, and a plasticizer, together with a suitable solvent. The result is a non-hygroscopic metal and glass adherent film that can be used for the production of strong metal foil products, labels, cigarette packages and other forms of containers.

The particular problem in accomplishing this invention was the production of a compound that would adhere to the very delicate, thin metal foil with its highly polished surface without the application of pressure, or any other mechanical aids. The problem is entirely different from securing adherence to heavy metal articles, where pressure can be employed, or where the article is structurally strong and relatively inflexible.

In the case of foil that is structurally weak, the problem is greatly magnified in its difficulties, both as to application and adherence. It is the object of this invention to provide a resulting product embodying foil that is structurally weak in a form that is structurally strong, thereby opening up an entirely virgin field for the use of foil which it cannot now occupy without this invention.

As an illustration of the various compounds which can be utilized for the practice of our invention, we recite the following. It should be distinctly understood that the principle of our invention can be carried out by other products in other combinations, and that we do not desire to confine ourselves to these examples alone, but recite them as typical of those compounds which we have found successful for the purpose of the practice of this invention.

Example 1

2.4 grams of vinyl acetate, 6 grams of phenolic resin, 2.5 grams of chlorinated diphenyl and 18 cc. of toluol, when applied at 105° C. for three minutes to metal foil, provide a strong, tough product having a water-white brilliancy and sparkle. The product is strongly adherent to metal, and cannot be detached therefrom at room temperatures, and the metal can be attached to glass by the application of heat and slight pressure.

Example 2

Vinyl acetate and paraffin wax or tallow or lanolin applied to foil produce a metal-adherent substantially transparent coating.

Example 3

A solution of polymerized vinyl acetate in which 70 per cent. of the acetate has been replaced by acetaldehyde, when dissolved in toluol and combined with 12 per cent. tricresyl phosphate produces a compound that can be applied at 110° C. and is metal-adherent.

Example 4

A mixture of 65 per cent. cellulose nitrate and a saturated alkyd resin, which is a compound of phthalic or other polybasic acid, with glycerine or other polyhydric alcohol, chemically modified with non-drying fatty acids in the proportion of a modifying acid of from 28 per cent. to 37 per cent., and the base resin from 63 to 72 per cent. The temperature of coating and drying the foil is 100° C., for approximately one-half hour. The surface is printable and adheres to metal foils.

Example 5

A saturated alkyd resin of 72 per cent., a modifying acid of 28 per cent., plus 10 per cent. by volume of dibutyl phthalate. The result is a clear, water-color resin, having a slight tack, flexible and adherent to metal foils. The temperature of drying is the same as in Example 1.

Example 6

A saturated alkyd resin of 72 per cent., modifying acid of 28 per cent. with 10 per cent. of dibutyl phthalate by volume, and the addition to the above of 10 per cent. of zinc stearate by weight. The temperature of drying is the same as in Example 1.

Example 7

An alkyd type resin, modified with natural resin acids plus 10 per cent. by weight of tung oil, dried at 105° C. for one-half hour gives a clear, light amber resin, slightly tacky, flexible, with good adherence to metal.

Example 8

An alkyd type resin, plus 5 per cent. tung oil, dried at 100° C., in four layers, each drying one-half hour, gives a flexible resin with good metal-adherence and no tack.

Example 9

A synthetic alkalyd resin, reacted with a phenol compound, heated to 130° C., twenty minutes, gives smooth, water-white, no tack, flexible, with very good metal foil adherence.

This resin is a pale solution, comprising 50 per cent. of synthetic resin and 50 per cent. zylol by weight.

Example 10

5 grams of a coumaron-indene resin polymerized, plus nitro-cellulose 6 grams, plus 2 grams refined heavy coal tar oil, at 110° C., 20 minutes, gives a flexible, non-tacky coat with very good adherence to glass and metal.

Example 11

25 grams of coumaron-indene resin, polymerized; 50 per cent. of nitro-cellulose and 4 grams of castor oil form a metal-adherent compound.

Example 12

A phthalic resin, plus pale blown castor oil 1.9 per cent., 110° C., twenty minutes, heat of adhesion 100° C. gives adherence to glass and to metal foil.

Example 13

A saturated alkyd resin and vinyl acetate in proportions of 30 per cent. to 50 per cent. of the former and 70 per cent. to 50 per cent. of the latter, applied and dried at 110° C. for fifteen minutes, gives a flexible metal-adhering and glass-adhering resin.

Example 14

Fatty acid pitch at a drying temperature of 100° C., one-half hour, gives a flexible body with good adherence to glass and metal.

Example 15

A saturated alkyd resin modified with 1 per cent. of linoleate of lead as a drier, applied at 120° C. for twenty-five minutes, gives a flexible coat, adhering to glass and metal.

Example 16

A saturated alkyd resin, plus 10 per cent. nitro-cellulose, plus 1 per cent. linoleate of lead, at a drying temperature of 135° C. for fifteen minutes gives a flexible coat with very excellent adherence to glass and metal.

Example 17

80 grams of an alkyd resin with 20 grams of a condensation resin of formaldehyde, with aromatic sulfonamides, 1 gram of linoleate of lead, 50 cc. toluol, 10 cc. naphtha and 10 cc. benzine gives a golden-colored, flexible compound with superior adherence to glass and metal. Temperature of drying is 130° C., for fifteen minutes.

Example 18

A saturated alkyd resin 89 per cent., white ceresin wax 10 per cent., linoleate of lead drier 1 per cent., applied at 130° C., and dried twenty-five minutes at that temperature on metal foil gives very good adherence to metal, and under re-heating and pressure applied adheres to glass.

Example 19

A saturated alkyd resin 89 per cent., carnauba wax 10 per cent., linoleate of lead drier 1 per cent., and dried at 130° C., for twenty-five minutes gives a flexible, slippery coat with no tackiness on the metal foil, with very good adhesion to metal and adheres to glass with the metal on reheating.

Example 20

A saturated alkyd resin 80 grams, 20 grams of a condensation resin of phenol formaldehyde, with aromatic sulfonamides, linoleate of lead 1 gram, 50 cc. toluol, 10 cc. solvent naphtha, 10 cc. benzine, plus 10 per cent. by weight of white ceresin wax, applied at 135° C. for fifteen minutes gives a flexible foil coat with very good adherence to metal and to glass when applied with the metal under heat and pressure.

Example 21

A saturated alkyd resin 80 grams, 20 grams of a condensation resin of formaldehyde, with aromatic sulfonamides, linoleate of lead 1 gram, 50 cc. toluol, 10 cc. solvent naphtha, 10 cc. benzine, plus 10 per cent. by weight of yellow carnauba wax, applied at 135° C. for fifteen minutes gives a flexible foil coat with very good adherence to metal and to glass when applied with the metal under heat and pressure.

Example 22

A saturated alkyd resin plus 1 per cent. linoleate of lead and 10 per cent. chlorinated rubber applied and dried at 105° C. gives a flexible film on foil with very good adherence to metal and to glass under reheating and pressure.

Example 23

A saturated alkyd resin plus 1 per cent. linoleate of lead, 10 per cent. chlorinated rubber and a condensation resin of formaldehyde with aromatic sulfonamides applied and dried at 120° C. for half an hour gives a flexible film on foil with very good adherence to metal, and to glass under reheating and pressure.

Example 24

A coumaron-indene resin 10 grams, plus a nitro-cellulose solution of 10 grams, plus 8 grams chlorinated diphenyl applied and dried at 130° C. for five minutes gives a flexible coat with good metal adherence.

Example 25

A saturated alkyd resin 97 per cent. paraffin oil 2 per cent., linoleate of lead 1 per cent. applied and dried at 130° C. for fifteen minutes gives a flexible coat on foil with good adherence to glass and metal.

Example 26

A saturated alkyd resin, a modifying acid, and a lead drier in the proportions of 70 per cent., 29 per cent. and 1 per cent., respectively. The lead may vary as high as 5 per cent. The compound is applied and dried at 130° C. for fifteen to twenty-five minutes on the foil. Under reheat and pressure the foil and resin adhere to glass.

Example 27

A saturated alkyd resin, plus lead linoleate from 3 to 7 per cent., plus one-half per cent. linoleate of cobalt for surface drying, applied at and dried at 130 to 135° C. from ten minutes to one-half hour, gives a flexible, soft coat with excellent adherence to metal and glass.

Example 28

Phthalic acid-glycerol resin modified with linseed oil, when dried at 135° C. for one hour, when applied to metal foil gives a clear, smooth appearance with a strong flexible resulting product.

Example 29

A phenol formaldehyde resin and China-wood oil, when applied and dried on metal foil at 140° C. for five minutes gives a flexible, relatively strong product that has good adherence to metal and to glass, when reheated and applied under pressure.

Example 30

China-wood oil, linseed oil, malic acid and a glycerol resin, modified with rosin ester, applied at 130° C. for fifteen minutes to metal foil produces a flexible product with a strong metal-adherence. If desired, tallow or paraffin wax can be added to prevent tackiness.

It will be understood we do not desire to be confined to the particular elements or products indicated, but include within the scope of our claims the equivalents thereof. The specification of percentages, temperatures and times of treatment are approximate and may be varied according to the subject-matter being treated without departing from our invention.

Our invention in this case is confined to claiming the new product, of which metal foil is a part. Cross reference is hereby made to our copending application on the material applied to the foil, Serial No. 7070, filed Feb. 18, 1935.

It will be understood that we desire to comprehend within our invention such modifications as come within the scope of the claims and the invention.

This application is a continuation-in-part of our application filed Feb. 18, 1935, Serial No. 7071.

Having thus fully described our invention, what we claim as new and desire to secure by Letters Patent, is:

1. In combination, an alkyd resin, a condensation resin of formaldehyde with aromatic sulfonamides, linoleate of lead, and wax intimately applied to metal foil.

2. In combination with metal foil of a saturated alkyd resin 80 grams, a condensation resin of formaldehyde with aromatic sulfonamides 20 grams, linoleate of lead one gram, and 10 per cent. by weight of white ceresin wax.

3. In combination, a metal foil and an integrally secured, flexible, glass and metal adherent, strengthening backing comprising 89% of a saturated alkyd resin, 10% nitrocellulose and 1% of linoleate of lead.

4. In combination, an inherently weak metal foil and an integrally secured, flexible, thermoplastic, glass and metal adherent, strengthening backing comprising a saturated alkyd resin 89%, white ceresin wax 10% and linoleate of lead drier 1%.

5. In combination, an inherently weak metal foil and an integrally secured, flexible, thermoplastic, strengthening backing comprising a saturated alkyd resin 89%, carnauba wax 10%, linoleate of lead drier 1%.

6. A composite thermoplastic glass adherent sheeting comprising, an inherently weak metal foil and an integrally secured, flexible, thermoplastic, strengthening backing composed of a saturated alkyd resin 80 grams, a condensation resin of formaldehyde with aromatic sulfonamides 20 grams, linoleate of lead 1 gram, and 10% by weight of yellow carnauba wax.

7. A composite thermoplastic glass adherent sheeting comprising, an inherently weak metal foil and an integrally secured, flexible, thermoplastic, strengthening backing composed of a saturated alkyd resin 89%, linoleate of lead 1% and chlorinated rubber 10%.

8. A composite thermoplastic glass adherent sheeting comprising, an inherently weak metal foil and an integrally secured, flexible, thermoplastic, strengthening backing composed of a saturated alkyd resin 89%, linoleate of lead 1%, chlorinated rubber 10% and a condensation resin of formaldehyde with aromatic sulfonamides.

9. A composite thermoplastic glass adherent sheeting comprising, an inherently weak metal foil and an integrally secured, flexible, thermoplastic, strengthening backing composed of a saturated alkyd resin 97%, paraffin oil 2%, and linoleate of lead 1%.

10. A composite thermoplastic glass adherent sheeting comprising, an inherently weak metal foil and an integrally secured, flexible, thermoplastic, strengthening backing composed of a saturated alkyd resin 92½% to 96½%, lead linoleate from 7% to 3%, and linoleate of cobalt ½%.

HARVEY G. KITTREDGE.
FRANK W. WILLIAMS.